US008844598B2

(12) United States Patent
Andersson (10) Patent No.: US 8,844,598 B2
(45) Date of Patent: Sep. 30, 2014

(54) FUSION WELDING SOCKET (75) Inventor: Thomas Andersson, Kungsor (SE)

(73) Assignee: Kungsors Plast AB, Kungsor (SE)

( * ) Notice: Subject to any disclaimer, the term of this patent is extended or adjusted under 35 U.S.C. 154(b) by 0 days.

(21) Appl. No.: 14/001,397

(22) PCT Filed: Feb. 14, 2012

(86) PCT No.: PCT/SE2012/050146
§ 371 (c)(1),
(2), (4) Date: Oct. 8, 2013

(87) PCT Pub. No.: WO2012/115571
PCT Pub. Date: Aug. 30, 2012

(65) Prior Publication Data
US 2014/0020842 A1 Jan. 23, 2014

(51) Int. Cl.
*B29C 65/20* (2006.01)
*B29C 65/34* (2006.01)
*F16L 39/00* (2006.01)
*B29C 65/00* (2006.01)

(52) U.S. Cl.
CPC ........... *B29C 65/3432* (2013.01); *F16L 39/005* (2013.01); *B29C 66/12822* (2013.01); *B29C 66/1284* (2013.01); *B29C 66/5221* (2013.01); *B29C 66/52231* (2013.01); *B29C 66/5229* (2013.01)
USPC .......................................... 156/499; 156/581

(58) Field of Classification Search
USPC ........ 156/304.1, 304.2, 304.6, 499, 580, 581, 156/583.1
See application file for complete search history.

(56) References Cited

U.S. PATENT DOCUMENTS 4,842,305 A * 6/1989 Kistenich et al. ............ 285/21.2
5,401,064 A 3/1995 Guest
(Continued)

FOREIGN PATENT DOCUMENTS

DE 1234163 B1 2/1967
EP 0 416 317 A2 3/1991
(Continued)

OTHER PUBLICATIONS

International Search Report for PCT/SE2012/050146 mailed May 25, 2012, 4 pages.

*Primary Examiner* — James Sells
(74) *Attorney, Agent, or Firm* — Myers Bigel Sibley & Sajovec PA (57) ABSTRACT A fusion welding socket for coupling together double walled plastic conduits including an inner pipe, an outer pipe surrounding the inner pipe and an annular space arranged between the inner and outer pipes. The fusion welding socket includes a main body comprising a first end portion, a second end portion and an intermediate portion. The intermediate portion has at least one inner diameter which is smaller than the inner diameters of the first and second end portions. Three heating coils are embedded in the first end portion, the second end portion and the intermediate portion, respectively, for fusing together the first and second end portions with a respective outer pipe of a first and second conduit and the intermediate portion with a respective inner pipe of the first and second conduit. A passageway includes an annular space is arranged to connect the annular spaces of the first and second conduit after fusion.

13 Claims, 3 Drawing Sheets (56) References Cited

U.S. PATENT DOCUMENTS

| | | |
|---|---|---|
| 5,927,762 A | 7/1999 | Webb |
| 6,394,502 B1 * | 5/2002 | Andersson .................... 285/21.2 |
| 6,521,072 B1 * | 2/2003 | Campbell ...................... 156/158 |
| 6,848,720 B2 * | 2/2005 | Carns et al. ................ 285/123.15 |
| 7,490,861 B2 * | 2/2009 | Boudry et al. ................ 285/21.2 |

FOREIGN PATENT DOCUMENTS

| | | |
|---|---|---|
| EP | 1 004 810 A2 | 5/2000 |
| EP | 1 128 121 A1 | 8/2001 |
| WO | WO 99/46532 | 9/1999 |
| WO | WO 2007/057629 A1 | 5/2007 |

* cited by examiner

FUSION WELDING SOCKET

FIELD OF THE INVENTION

The present invention relates to a fusion welding socket for coupling together double walled plastic conduits. The fusion welding socket is adapted to receive the ends of outer and inner pipes of the double walled conduits to be joined together with a close fit and incorporates coils of resistance wires or filaments which, when energized cause the material in the welding socket to fuse together with the material in the outer and inner pipes at the positions of said coils.

BACKGROUND AND PRIOR ART

Fusion welding sockets are used generally in joining together plastic pipes and in connecting plastic pipes to pipe bends, T-pieces and the like. The welding sockets are usually provided with inwardly projecting shoulders in their center regions and incorporate a resistance coil on each side of the shoulders. When joining two pipes together, the pipe ends can be inserted into the socket until stopped by the shoulders. The person coupling the pipes will then know that the pipes have been centered correctly in the socket. A voltage source is then connected to the coils. The material in the inner surface of the socket and in contact with the material at the pipe ends will therewith fuse together locally as a result of the heat generated in the resistance wires.

This represents a very simple and effective method of joining together simple pipe conduits. Many installations, for instance gasoline transporting installations, require the use of double walled conduits, i.e. conduits which include two coaxial pipes and which are constructed so as to provide an annular space between the radially inner and the radially outer pipe. Such an annular space of a double walled conduit is sometimes referred to as a secondary containment. The annular space is used to detect any leakage that may occur in the inner or the outer pipe, in addition to enhancing safety against leakage onto the surrounding ground. To this end, the space may contain a gas, suitably air that has a pressure in excess of or below the ambient pressure. The occurrence of a leakage can be detected, by monitoring the pressure in said space. It is important that pressure changes in the space between the pipes are able to propagate along the full length of a monitoring zone in a conduit system or pipework. When joining such pipes, the inner pipe must be joined per se and the outer pipe must be joined per se, such that communication is also obtained between the annular spaces in the mutually joined double conduits.

EP 1 062 454 A discloses a previously known electro fusion coupler for joining together double walled conduits. This known coupler has a larger diameter at its ends than along an intermediate part thereof. The diameter at said ends is adapted to receive an outer pipe with a close fit and the diameter along said intermediate part is adapted to receive with a close fit an inner pipe of a double-walled conduit that includes two coaxial pipes and a leakage detection space between said pipes. The socket includes heating coils of resistance wires or filaments that when energized function to locally fuse the socket material with the material of both the outer pipes and the inner pipes in two double-pipe conduits to be joined together with the aid of the fusion welding socket. The fusion welding socket is further provided with a number of passageways arranged in the intermediate part for connecting together the leakage detection spaces of the two conduits. These passageways are formed as longitudinal cylindrical through holes drilled in the intermediate part or as two to four narrow tubular elements, such as steel tubes that arranged longitudinally in the intermediate part by being moulded into the socket during manufacturing.

BRIEF DESCRIPTION OF THE INVENTION

An object of the invention is to provide an enhanced fusion welding socket for coupling together double walled plastic conduits.

Another object is to provide such a fusion welding socket which enhances the security of double walled conduit installations at which any number of double walled conduits have been joined together by means of a corresponding number of such fusion welding sockets.

It is an additional object to provide such a fusion welding socket which ensures that a double walled conduit installation comprising any number of double walled conduits joined together by means of a corresponding number of such fusion welding sockets will exhibit an annular space or a secondary containment over the entire length of the installation.

Another object is to provide such a fusion welding socket which to a high degree ensures a reliable communication between the annular spaces of the double walled conduits which are joined together.

A further object is to provide such a fusion welding socket which causes only a comparatively low pressure drop to a medium flowing through the socket, between the annular spaces of the two conduits.

An additional object is to provide such a fusion welding socket which ensures a reliable and leakage proof connection of two double walled conduits.

Still a further object is to provide such a fusion welding socket which is easy to install.

Yet another object is to provide such a fusion welding socket which may be readily manufactured at a comparatively low cost.

These and other objects are provided by a fusion welding socket of the kind as set out in the preamble of claim 1, which fusion welding socket exhibits the special technical features specified in the characterizing portion of the claim.

The fusion welding socket according to the invention is intended for coupling together double walled plastic conduits, which double walled conduits comprise an inner pipe, an outer pipe surrounding the inner pipe and an annular space arranged between the inner and outer pipes. The fusion welding socket comprises a main body comprising a first end portion, a second end portion and an intermediate portion arranged longitudinally between the first and second end portions, which intermediate portion has at least one inner diameter which is smaller than the inner diameters of the first and second end portions. First, second and third heating coils are embedded in the first end portion, the second end portion and the intermediate portion respectively, for fusing together the first and second end portions with a respective outer pipe of a first and second conduit and the intermediate portion with a respective inner pipe of the first and second conduit. A passageway is arranged to connect the annular spaces of the first and second conduit after fusion. According to the invention, the passageway comprises an annular passage which circumferentially surrounds the intermediate portion and which extends longitudinally over the entire intermediate portion and at least partially over the first and second end portions.

Reference in the following and in the claims to a pipe coupling and pipe joining operation implies joining together two double-pipe conduits and joining of one such conduit to a joint piece, a pipe bend and the like that include double-pipes or pipes provided with passageways in the walls thereof with the intention of providing requisite communication with the space between the pipes in a double-pipe conduit.

A fusion welding socket of this kind enables, for instance, two double-pipe conduits to be joined together with the aid of one single component and also enables all necessary fusion welding operations to be carried out in one single step, by connecting an outer voltage source to two terminals on the socket. This greatly facilitates the work that is entailed in joining together double-pipe conduits, and also makes the work less expensive. Furthermore, the use of a single welding socket also enables a check to be made as to whether or not the inner pipe has been welded correctly, from outside the conduit.

By arranging the passageway for connecting the annular spaces of two conduits such that it comprises an annular passage which surrounds the intermediate portion and which extends longitudinally over the entire length of the intermediate portion and at least partially over both end portions, the passageway will longitudinally overlap the annular space of both double walled conduits that are connected by means of the socket. Hereby, it is assured that any puncture, leakage or other fracture, either from the outside or from the inside, will debouch into the secondary containment of the conduit installation, irrespective of if such fracture occurs in the conduits or in the fusion welding socket. With the inventive fusion welding socket, a secondary containment will be formed along the entire length of an conduit installation wherein several any number of double walled conduit have been joined by a corresponding number of fusion welding sockets. By this means the security in regard of leakage at double walled conduit installations is greatly enhanced.

Additionally, the passageway may readily be arranged with a comparatively large cross sectional area. This entails for several advantages. Firstly, such a large cross sectional area of the passageway reduces the risk of that the passageway is clogged by foreign material that might enter into the passageway. Secondly, by means of a large cross sectional area, the fusion welding socket will present only a comparatively small flow resistance to the media flowing from the annular space of one conduit to the other. Thereby, the socket will present only a comparatively small pressure drop with regard to the media transported by the conduits' annular spaces. The large cross sectional flow area thus ensures a reliable transportation of media in the conduits' annular spaces and pressure communication there-between also at comparatively long conduit installations, where a large number of conduits have been joined together by a corresponding large number of fusion welding sockets. Thirdly, the annular arrangement of the passageway entails for that a large cross sectional flow area may be readily achieved by means of a fusion welding socket which is comparatively simple in construction, reliable in use, easy to handle and install and which may be manufactured at a comparatively low cost.

Communication between the annular spaces of the conduits and the annular passage of the socket may be readily accomplished by means of channels arranged through the main body, which channels connect a space arranged radially inside each of the first and second end portions with the annular passage.

The channels may comprise at least one slit which is arranged through the main body and which defines a smallest opening area through the main body. Such a slit provides a reliable communication and is comparatively easy to arrange in the main body.

The at least one slit may define a generally rectangular opening area in the main body. By this means, a comparatively large communication opening may be provided without adversely affecting the structural strength of the welding socket.

The smallest opening area is preferably larger than 50% of a largest radial cross sectional area of the annular passage. Hereby, a reliable communication also through the slit is accomplished.

The slit may define a smallest opening area which extends circumferentially through the main body between 10° and 80°. Also this ensures a reliable communication through the slit.

The passageway may comprise two radially opposing slits arranged through the main body at each of the first and second ends. Hereby an even larger communication area through the main body may be provided without adversely affecting the structural strength of the welding socket.

Alternatively the channels may comprise a plurality of tubular ducts arranged through a respective end portion of the intermediate portion of the main body. This allows for a comparatively simple manufacturing of the welding socket.

The channels may be inclined in relation to the longitudinal axis of the main body. By this means communication between the annular spaces of the conduits and the annular passage of the welding socket is readily achieved in a simple manner.

The annular passage may be defined by the main body and an outer sleeve which surrounds the main body and which extends longitudinally over the intermediate portion. This entails for an easy manufacturing of the socket at a comparatively low cost.

The main body and the outer sleeve may be formed as an integral part. By this means the welding socket may be manufactured by a comparatively low number of manufacturing operations. The integral part arrangement may also enhance the structural strength of the welding socket.

Alternatively, the main body and the outer sleeve may be formed of separate components. Hereby, the use of different materials in the main body and the sleeve is facilitated, if so desired.

The fusion welding socket may comprise fourth heating coils arranged for fusing together the main body with the outer sleeve. By this means it is possible to inspect, by looking through the slit arranged in the main body, that the conduits a properly inserted in the welding socket before positioning the sleeve around the main body. Thereafter, the conduits may be fused together with the welding socket simultaneously with fusing together the sleeve with the main body in a single fusing operation.

Further objects and advantages of the invention will be apparent from the following detailed description of embodiments and from the appended claims.

BRIEF DESCRIPTION OF THE DRAWINGS

Below exemplifying embodiments of the invention will now be described in more detail with reference to the figures in which.

DETAILED DESCRIPTION OF EMBODIMENTS

FIGS. 1-4 illustrates the use of a fusion welding socket 30 according to a first embodiment of the invention, in joining two double-walled conduits 10, 20 each including an outer pipe 11, 21, an inner pipe 12, 22 and an intermediate annular space 13, 23. The socket 30 comprises a tubular main body 31 made of polyethylene, PE. The main body may however also be made of other heat fusible polymer materials such as polyamide, PA or the like. The main body 31 includes a first end-portion 32 and a second end portion 33. The end portions 32, 33 have the same inner diameter, which diameter permits the outer pipes 11, 21 to be fitted in a respective end portion 32, 33, with a close fit. An intermediate portion 34 of the main body 31 is arranged longitudinally between the two end portions 32, 33. The intermediate portion 34 has an inner diameter, which is smaller that the inner diameter of the end portions 32, 33 and receives the inner pipes 12, 22 with a close fit. Hence, the exemplifying embodiment of the welding socket is arranged for joining together two double walled conduits at which the outer pipes have mutually the same outer diameter and the inner pipes have mutually the same outer diameter. However, it is also possible to arrange the end portions of the socket's main body with mutually different inner diameters such that these end portions may receive outer pipes having different outer diameters. Likewise, it is possible to arrange the intermediate part such that it exhibits different inner diameters at a respective end of the intermediate portion, for allowing inner pipes of mutually different outer diameters to be received therein.

A first heating coil 35a is embedded, by moulding, in the first end portion 32, in proximity to the inner surface thereof. In a corresponding manner, a second heating coil 35b is embedded in the second end portion 33. A third heating coil 35c, 35d is embedded in the intermediate portion 34. In the shown embodiment, the third heating coil is divided longitudinally into two separate coil sections 35c and 35d respectively. The first 35a, second 35b and third 35c-d coils are electrically connected in series such that they form an electrical circuit. The electrical circuit comprises two end terminals (not shown) that are arranged in a respective terminal sleeve 36a, 36b which sleeves protrude radially outwardly from the outer surface of the main body 31, at it's second end portion 33. In the embodiment shown in FIGS. 1-4, the two terminal sleeves 36a, 36b are arranged side by side on the in the same radial plane of the main body 31.

Figure 1:
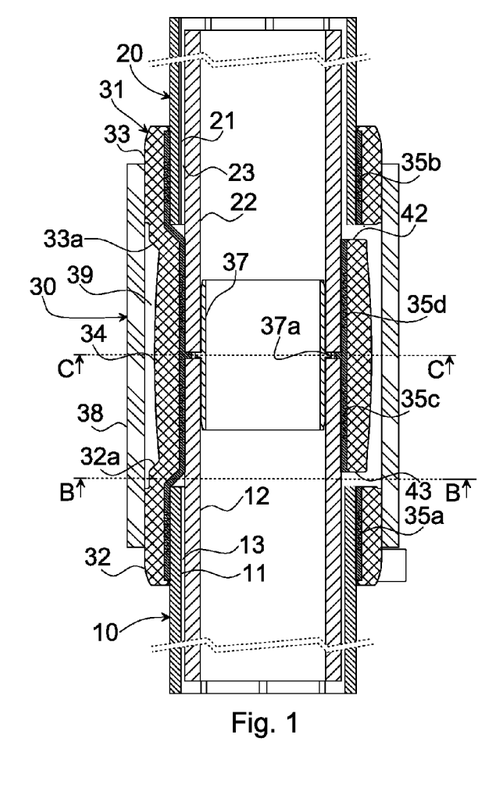
FIG. 1 is a longitudinal section at lines A-A of FIG. 2 through a fusion welding socket according to one embodiment of the invention.
Figure 2:
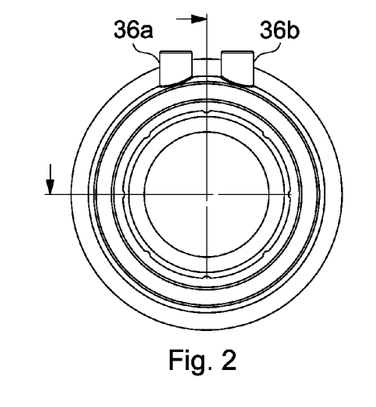
FIG. 2 is an end view of the fusion welding socket shown in FIG. 1.

The socket also comprises an inner distance sleeve 37, which is intended to be arranged inside mutually proximate end portions of the inner pipes 12, 22. The distance sleeve 37 is generally cylindrical and is, at its longitudinal center, provided with a radially outwardly protruding circumferential flange 37a. The distance sleeve 37 comprises an electrically conductive material which ensures that electrically conductive inner layers (not shown) of the two inner pipes are electrically connected to each other. The circumferential flange 37a serves a stop for the end faces of the inner pipes 12, 22 and facilitates correct positioning of the inner pipes 12, 22, when they are introduced into the welding socket 30.

The welding socket 30 also comprises a cylindrical outer sleeve 38. In the embodiments illustrated in the drawings, the outer sleeve 38 and the main body 34 have been manufactured as separate components. The outer sleeve is formed of polyethylene, PE. The outer sleeve may however also be made of other heat fusible polymer materials such as polyamide, PA or the like. The outer sleeve 38 is arranged coaxially outside the main body 34 and surrounds entirely and sealingly the intermediate portion 34 of the main body. The outer sleeve 38 and the main body 34 are sealingly joined together at both their respective end portions. For this reason the outer sleeve has in inner diameter which essentially corresponds to the outer diameter of the main body's end portions 32, 33. In the example shown in FIGS. 1-4, the outer sleeve has been sealingly joined with main body 34, by means of a heat fusion operation during manufacturing of the welding socket 30. The outer sleeve may however also be joined to the main body 34 during manufacturing by other means and methods, such as by gluing or the like. It is also possible that the outer sleeve and the main body are formed as an integral part during manufacturing, e.g. by simultaneous moulding in a common mould.

As a further alternative the outer sleeve and the main body may be manufactured and transported to the installation site as separate components. The outer sleeve may then be sealingly joined to the main body by means of a fourth heating coil (not shown) which is embedded in proximity to the outer surfaces of the main body's end portions, and which may be electrically connected in series with the first, second and third heating coils. By this means it is possible, during usage of the welding socket, to first insert the inner and outer pipes of the two conduits into the main body, without the outer sleeve being positioned radially outside the intermediate portion. Correct insertion of the pipes may then be verified by inspection through channels that are arranged through the main body (as described further in detail below). When correct insertion of the pipes has been verified the outer sleeve may be displaced longitudinally along the main body to a position which corresponds to the position as indicated in FIG. 1. Such longitudinal or axial displacement of the outer sleeve is made possible by the two protruding terminal sleeves being arranged in a common radial plane at one end of the main body. Once the pipes and the outer sleeve have been correctly positioned all pipes and the outer sleeve may simultaneously be joined to the main body by connecting a voltage source to the end terminals and simultaneously supplying electrical power to the first, second, third and fourth heating coils.

Irrespective of which of the above mentioned methods is used for sealingly joining the outer sleeve 38 with the main body 31, the main body and the outer sleeve jointly defines an annular passage which is arranged radially outside of the main body's intermediate portion 34. The annular passage 39 surrounds the intermediate portion entirely in the circumferential direction. The annular passage 39 further extends longitudinally over the entire length of the intermediate portion 34. The annular passage 39 further extends longitudinally over a portion of each end portions 32, 33. By this means the annular passage will overlap the end portions of the outer pipes 11, 21, when these are correctly inserted into the welding socket 30.

Figure 3:
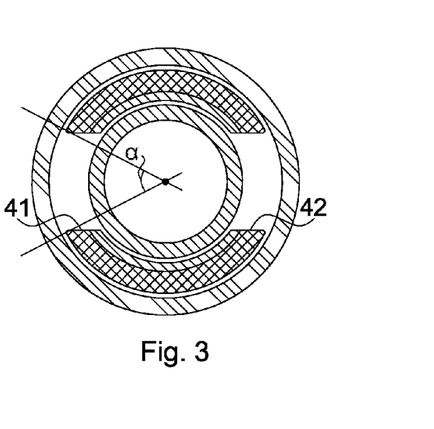
FIG. 3 is a cross section at line B-B of FIG. 1.
Figure 4:
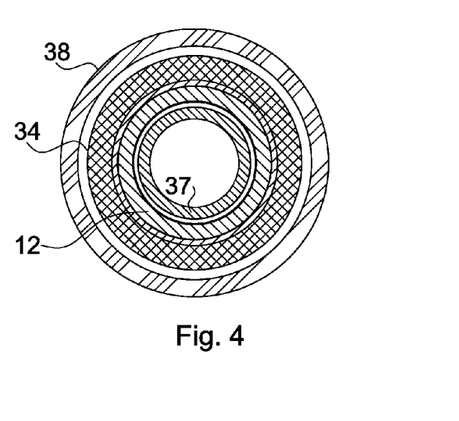
FIG. 4 is a cross section at line C-C of FIG. 1.

As best seen in FIGS. 1 and 3, the main body 31 is provided with through penetrating slits 41, 42, 43. The slits form channels through the main body 31 and connect a space arranged radially inside each of the first 32 and second 33 end portions with the annular passage 39. At the embodiment shown in FIGS. 1-4, the channels 41, 42, 43 are are arranged at inclined bridging portions 32a, 33a of the main body 31, which bridging portions 32a, 33a connect the intermediate portion 34 with the respective end portions 32, 33. At each such bridging portion 32a, 33a a pair of radially opposing channels 41, 42, 43, are arranged. Each channel 41, 42, 43 defines a rectangular opening area, which in the shown embodiment is constant over the radial length of each channel 41, 42, 43. The total opening area defined by both channels at each bridging portion corresponds to approximately 100% of the smallest cross sectional area of that part of the annular passage which is arranged between said bridging portions 32a, 33a. The opening area of each channel 41, 42, 43 extends circumferentially over an angle a of approximately 30°.

The so arranged channels 41, 42, 43 ensure a reliable medium communication between the annular space 13, 23 of each conduit 10, 20 with the annular passage 39 arranged in the welding socket. The arrangement of the annular passage 39 and the channels 41, 42, 43 further provide a reliable communication between the annular spaces 13, 23 of two conduits 10, 20 joined together by means of the fusion welding socket 30. The passageway formed by the annular passage and the channels present a small pressure drop and reduces the risk of foreign material to clog or in any other way impede the free transport of medium or the propagation of any pressure change that may occur at any position of the total conduit installation. By this means a reliable leakage detection may readily be achieved, also at long conduit installations where a large amount of conduits have been joined together by a correspondingly large number of fusion welding sockets.

Figure 5:
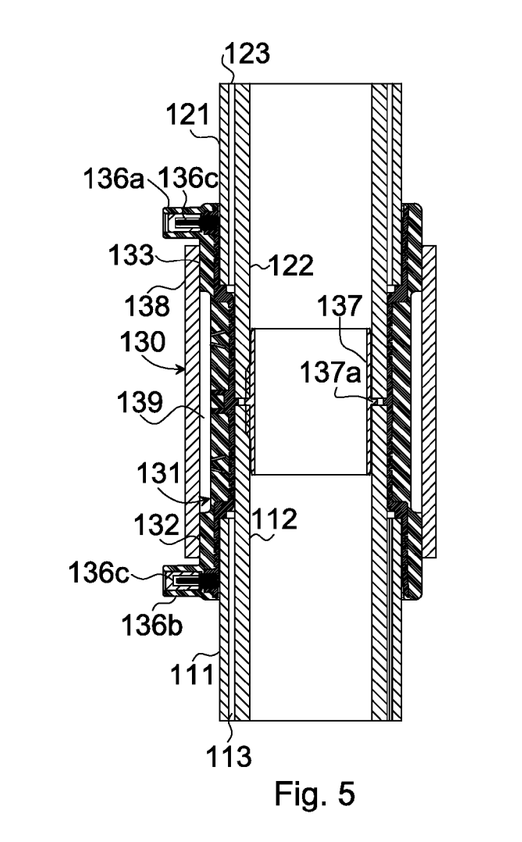
FIG. 5 is a longitudinal section through a fusion welding socket according to another embodiment of the invention.
Figure 6:
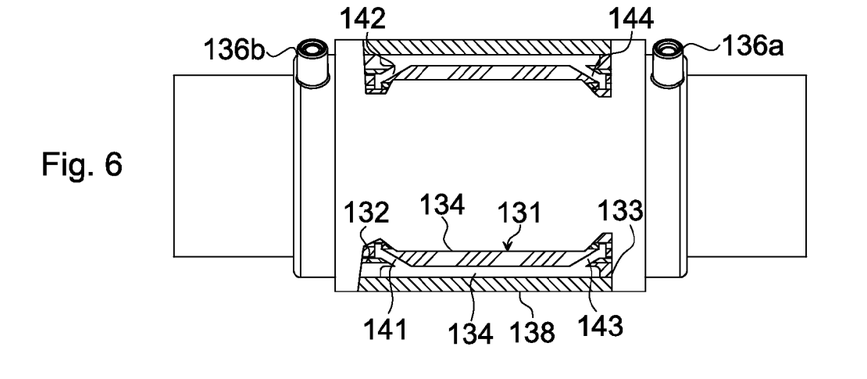
FIG. 6 is a plan view, partly in section of the fusion welding socket shown in FIG. 5.

FIGS. 5 and 6 illustrate an alternative embodiment of the welding socket according to the invention. In these figures components of the welding socket which corresponds to the embodiment shown in FIGS. 1-4 have been given the same reference numbers added by 100. The welding socket 130 comprises a main body 131 and an outer sleeve 138. The outer sleeve is arranged between two longitudinally spaced radially protruding terminal sleeves 136a, 136b, in which terminal sleeves a respective end terminal 136c, 136d is arranged. The end terminals 136c, 136d are electrically connected to an electrical circuit comprising a first, a second and a third heating coil, which are not shown in FIGS. 4 and 5. The main body 131 comprises a first end portion 132 which receives one outer pipe 111, a second end portion 133 which receives another outer pipe 121 and an intermediate portion 134 which receives two inner pipes 112, 122. An inner sleeve 137 is arranged inside the inner pipes 112, 122 and a radially protruding circumferential flange 137a is arranged between and in contact with end surfaces of the inner pipes 112, 122.

The outer sleeve 138 is sealingly joined to the outside of the end portions 132, 133 of the main body 131. The outer sleeve 138 and the main body 131 define them-between an annular passage 139, which extends circumferentially around the entire intermediate portion 134 and longitudinally over the entire length of the intermediate portion 134 and partially over the end portions 132, 133.

The embodiment shown in FIGS. 5 and 6 differs from the embodiment shown in FIGS. 1-4 mainly by the arrangement of channels 141, 142, 143, 144 which are arranged through the main body 131. At this embodiment the channels 141-144 are formed as a plurality of tubular ducts which are drilled through the main body 131. The tubular ducts may however also be formed by other means, e.g. by embedding tubular pipes or by creating tubular voids during moulding of the main body 131. In the shown example, two channels are arranged at each end of the intermediate portion 134 of the main body, i.e. in proximity to a respective end portion 132, 133 of the main body. Each channel 141-144 is inclined relative to the longitudinal axis of the main body 131, such that they form a respective communication between the annular passage 139 and a space arranged radially inside of the end portions 132, 133. By this means the channels 141-144 will constitute communication channels between the annular spaces 113, 123 of each of the conduits and the annular passage 139. The number of channels 141-144 arranged at each end of the main body 131 and the cross sectional area of each channel is chosen such as to ensure a reliable communication, presenting a comparatively low pressure drop between the annular spaces 113, 123 of the conduits 110, 120 and the annular passage of the welding socket 130.

Figure 7:
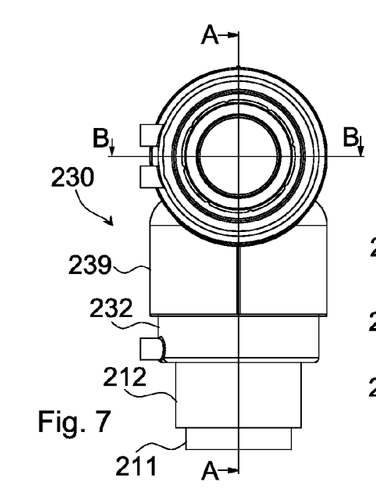
FIG. 7 is a plan view of a fusion welding socket according to a further embodiment of the invention.
Figure 8:
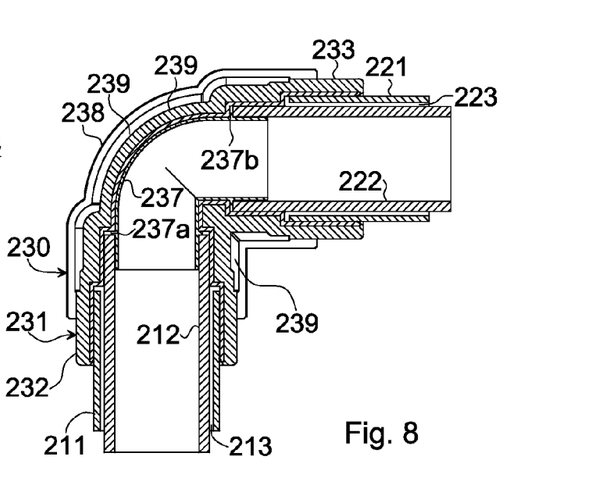
FIG. 8 is a section along line A-A in FIG. 7.
Figure 9:
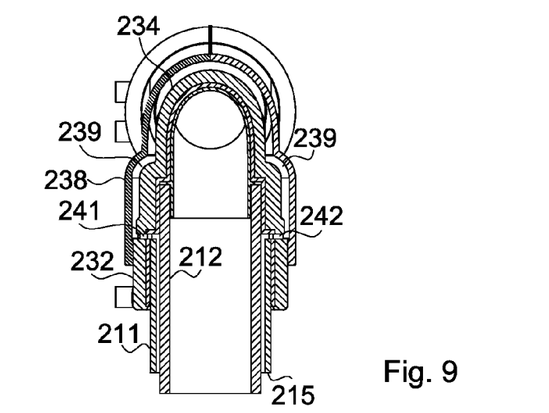
FIG. 9 is a section along line B-B in FIG. 7.

FIGS. 7-9 illustrate a further exemplifying embodiment of the welding socket according to the invention. In these figures components of the welding socket which corresponds to the embodiment shown in FIGS. 1-4 have been given the same reference numbers added by 200. At this embodiment the welding socket constitutes a 90° conduit bend. The welding socket 230 comprises a main body 231 and an outer sleeve 238. The main body 231 comprises a first end portion 232 which receives one outer pipe 211, a second end portion 233 which receives another outer pipe 221 and an intermediate portion 234 which receives two inner pipes 212, 222. An inner bent sleeve 237 is arranged inside the inner pipes 212, 222. Two radially protruding circumferential flanges 237a, 237b are arranged between and in contact with the end surface of a respective inner pipe 212, 222 and the main body 231.

The outer sleeve 238 is sealingly joined to the outside of the end portions 232, 233 of the main body 231. The outer sleeve 238 and the main body 231 define them-between an annular passage 239, which extends circumferentially around the entire intermediate portion 234. The annular passage further extends over the entire bent length of the intermediate portion 234 and partially over the first 232 and second 233 end portions.

Communication between the annular passage 239 and the annular spaces 213, 223 arranged between the outer 211, 221 and inner 212, 222 pipes of each conduit is provided by means of channels in the form of slits 241, 242 (see FIG. 9) arranged through the main body 231. In the illustrated example each slit 241, 242 is formed as a radially and circumferentially extending slit through the main body 231. Each slit 241, 242 forms a rectangular opening through the main body 231. Two such slits 241, 242 are arranged mutually opposing at each end portion 232, 233, adjacent to the intermediate portion 234. It is however possible that the communicating channels, also at embodiments where the socket forms a conduit bend, are formed as radially or transversely arranged tubular ducts (not shown).

Above exemplifying embodiments of a fusion welding socket according to the invention have been described. The invention is however not limited to these embodiments. To the contrary the invention may be freely varied within the scope of the appended claims. The fusion welding socket may e.g. be arranged and used for connecting a double walled conduit to other double walled elements such as conduit bends other than 90° bends, terminating sockets, connecting sockets, reduction elements, and so on.

The invention claimed is:

1. A fusion welding socket for coupling together double walled plastic conduits, which double walled conduits comprise an inner pipe, an outer pipe surrounding the inner pipe and an annular space arranged between the inner and outer pipes, which fusion welding socket comprises:
 a main body comprising a first end portion, a second end portion and an intermediate portion arranged longitudinally between the first and second end portions, which intermediate portion has at least one inner diameter which is smaller than the inner diameters of the first and second end portions;
 first, second and third heating coils embedded in the first end portion, the second end portion and the intermediate portion respectively for fusing together the first and second end portions with a respective outer pipe of a first and second conduit and the intermediate portion with a respective inner pipe of the first and second conduit; and a passageway which is arranged to connect the annular spaces of the first and second conduit after fusion, wherein the passageway comprises an annular passage which circumferentially surrounds the main body and which extends longitudinally over the entire intermediate portion and at least partially over each of the first and second end portions.

2. A fusion welding socket according to claim 1, wherein the passageway comprises channels arranged through the main body, which channels connect a space arranged radially inside each of the first and second end portions with the annular passage.

3. A fusion welding socket according to claim 2, wherein the channels comprise at least one slit which is arranged through the main body and which defines a smallest opening area through the main body.

4. A fusion welding socket according the claim 3, wherein the slit defines a generally rectangular opening area in the main body.

5. A fusion welding socket according to claim 3, wherein the smallest opening area is larger than 50% of a largest radial cross sectional area of the annular passage.

6. A fusion welding socket according to claim 3, wherein the slit defines a smallest opening area which extends circumferentially through the main body between 10° and 80°.

7. A fusion welding socket according to claim 3, wherein the passageway comprises two radially opposing slits arranged through the main body at each of the first and second ends.

8. A fusion welding socket according to claim 1, wherein the channels comprise a plurality of tubular ducts arranged through a respective end portion of the intermediate portion of the main body.

9. A fusion welding socket according to claim 8, wherein the channels are inclined in relation to a longitudinal axis of the main body.

10. A fusion welding socket according to claim 1, wherein the annular passage is defined by the main body and an outer sleeve which surrounds the main body and which extends longitudinally over the intermediate portion and at least partially over the first and second end portions.

11. A fusion welding socket according to claim 10, wherein the main body and the outer sleeve are formed as an integral part.

12. A fusion welding socket according to claim 11, wherein the main body and the outer sleeve are formed of separate components.

13. A fusion welding socket according to claim 1, comprising fourth heating coils arranged for fusing together the main body with the outer sleeve.

\* \* \* \* \*

UNITED STATES PATENT AND TRADEMARK OFFICE
CERTIFICATE OF CORRECTION

| | | |
|---|---|---|
| PATENT NO. | : 8,844,598 B2 | Page 1 of 1 |
| APPLICATION NO. | : 14/001397 | |
| DATED | : September 30, 2014 | |
| INVENTOR(S) | : Thomas Andersson | |

It is certified that error appears in the above-identified patent and that said Letters Patent is hereby corrected as shown below:

On Title Page:
Please add Item (30) Foreign Application Priority Data

February 25, 2011   (SE)    1150170-7

In the Specification:
Column 1, Line 2: Please add the following new heading and paragraph immediately after the title:

RELATED APPLICATIONS

The present application is a 35 U.S.C. § 371 national phase application of PCT International Application No. PCT/SE2012/050146, filed February 14, 2012, which claims priority from Swedish Patent Application No. 1150170-7, filed February 25, 2011; the disclosures of which are hereby incorporated herein by reference in their entirety. PCT International Application No. PCT/SE 2012/050146 is published as PCT Publication No. WO 2012/115571.

Signed and Sealed this
Seventeenth Day of February, 2015

Michelle K. Lee
*Deputy Director of the United States Patent and Trademark Office*